Figure 1:
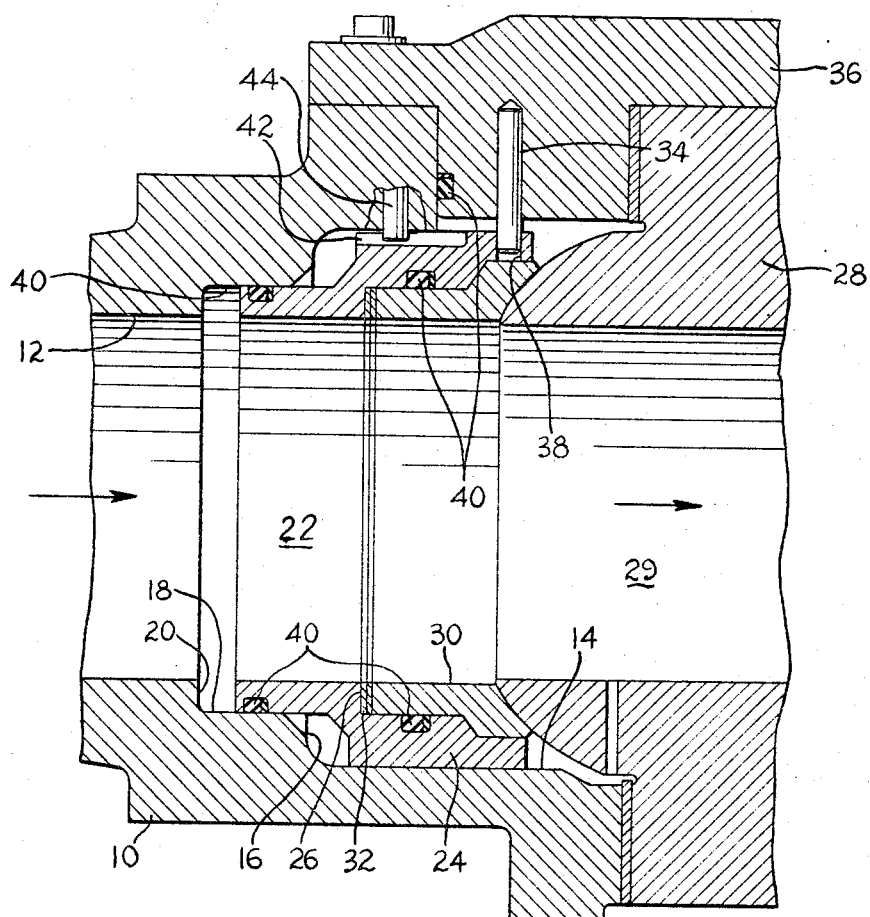

INVENTORS
ROBERT J. MEIMA
JAMES D. AITKEN
BY
William R. Wright Jr.
AGENT

3,269,691
BALL VALVE SEAL SUPPORT
Robert J. Meima, Oakland, and James D. Aitken, Whippany, N.J., assignors to Thiokol Chemical Corporation, Bristol, Pa., a corporation of Delaware
Filed Sept. 20, 1963, Ser. No. 310,399
1 Claim. (Cl. 251—159)

This invention relates generally to valve seals and more particularly to a novel support for ball valve seals.

As is well known in the art, ball valves are provided with leak-preventing circular or annular seals which form the upstream and downstream valve seats, some sort of support therefor usually being provided. Because of the fluid pressures involved and of the severe wear to which the seals are subjected, it is necessary to employ means to constantly urge the seals against the surface of the ball to prevent leakage. Such means are springs or other resilient devices or combinations thereof. As a result, there exists a problem of wear on the sealing surfaces (seals and ball) due to abrasive substances present in the fluid so as to require their frequent replacement. The removal of the valve ball from known valve casings for replacement, etc. is not only difficult but frequently results in damage to one or more of the seals.

The main object of the present invention is to provide an improved valve seat for ball valves which will obviate the above and other difficulties attendant the replacement of the various valve parts.

An important object of the present invention is to provide a retractible valve seat for ball valves which will enable ready removal of the valve ball without injury to the seals.

Another important object of the present invention is to provide a novel valve seat for ball valves which is rectractible with respect to the valve ball and which includes seal support means and resilient means urging the seal against the ball when in non-retracted operative position.

A further important object of the present invention is to provide a ball valve of a novel construction and arrangement for the reception of a cam retractible ball valve seat including a seal and resilient means for urging it against the valve ball in the operative or non-retracted position.

A still further important object of the present invention is to provide an improved ball valve structure of the type described which will be simple and practical in construction, rugged and of long life in use, and susceptible of ready and economic manufacture.

Other objects and advantages of the present invention will become apparent during the course of the following description.

Figure 2:
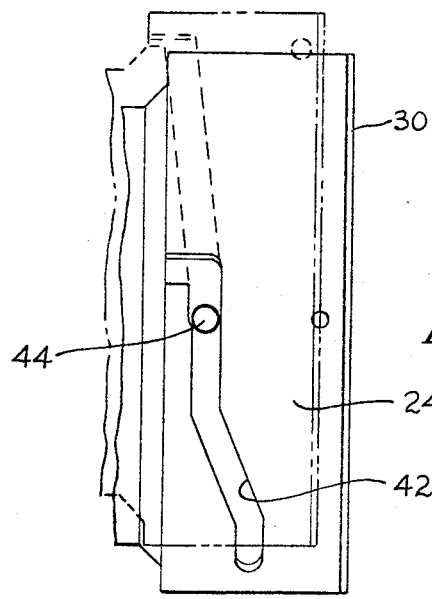

In the drawings we have shown one embodiment of the invention. In this showing:

FIGURE 1 is a fragmentary, central, longitudinal sectional view of the invention; and FIGURE 2 is an elevational view of the ball valve seat and seal showing the cam means for effecting retraction of the seat.

Referring to the drawings, numeral 10 designates a valve casing having a fluid inlet port 12, a central bore 14 terminating in a shoulder 16 defining a reduced bore 18 which also terminates in a shoulder 20 defining the inlet port 12. The casing 10 is symmetrical about its central vertical axis and the bores 14, 18 and shoulders 16, 20 are also provided adjacent the outlet port (not shown) as is a valve seat so that only that seat adjacent the inlet end, which is identical, need be described.

As seen in FIGURE 1, the valve seat 22 is cylindrical and has a portion of enlarged diameter 24 and an inner peripheral shoulder 26, and is slidable and rotatable in the bores 14 and 18 from the operative position shown to a retracted position against the shoulders 16 and 20. A ball valve 28 having the usual flow passage 29 is rotatably mounted in the casing 10 and its surface seats against the mating end surface of an annular seal 30 which may be of any desired, suitably hard and rigid, wear-resistant material such as one of the "plastics" or relatively soft metal.

The seal 30 is supported by and slidably mounted within the enlarged seat portion 24 of the valve seat 22 and is urged against the surface of the valve ball 28 by a wave washer 32 acting between its left end and the inner peripheral shoulder 26. Movement of the valve seat (or seal carrier) 22 away from the ball 28 is limited by the shoulders 16 and 20 while movement toward the ball is limited by a locating and retaining pin 34 projecting from the cover 36 of the valve casing 10 and into a recess 38 formed in the periphery of the valve seat seal carrier portion 24. The cover 36, seal 30, and valve seat 22 are each provided with seals 40 to prevent leakage between them and the surfaces co-operating therewith.

The outer periphery of the valve seat seal carrier portion 24 has an angularly disposed cam track 42 formed therein into which a cam pin 44 fixed to the valve housing 10 projects so as to effect axial movement of the valve seat 22 in the bores 14, 18 when the seat is rotated in either direction as by a spanner wrench inserted through the valve casing cover opening with the cover 36 removed.

It will now be apparent that the valve seat 22 is locked in operative position (FIGURE 1) by the retaining pin 34 and that in this position the seal 30 is in sealing engagement against the ball 28 and resiliently urged thereagainst by the wave washer 32 to increase the sealing effect and to accommodate for wear of the seal 30 and of the ball 28.

To remove the ball 28 without damage to the seal 30, the latter and its carrier must be retracted (to the left in the figures) a sufficient distance to permit the surface of the ball to clear the seal or to a position against the shoulders 16 and 20. This is effected by withdrawing the retaining pin 34 and rotating the valve seat 22, 24, with a spanner wrench to cause the fixed cam pin 44 to ride in the cam slot 42 and move the carrier from the full line position of FIGURE 2 to the dotted line position. This relaxes the resilient pressure of the wave washer 32 and carries the seal 30 away from the ball which may now be withdrawn without distorting or otherwise damaging the seal. Conversely, when a ball is installed, the seal carrier is rotated to move the seal into engagement with the ball with the wave washer compressed to provide the seal with an initial sealing force, and the reinsertion of the retaining pin 34 prevents any further rotary or axial movement of the carrier.

It will now be readily apparent that the ball valve and seal carrier construction of the invention enables the easy insertion or removal of the valve ball without damage to the seal and without interference with the floating or resilient action of the ball seat seal, and the valve seat provides hoop strength for the seal.

It is to be understood that the form of our invention herewith shown and described is to be taken as a preferred example of the same and that various changes in the shape, size and arrangement of parts may be resorted to without departure from the spirit of the invention or the scope of the subjoined claim.

We claim:

A valve comprising, in combination, a casing having a central bore terminating in shoulders defining axially outer reduced bores which terminate in shoulders defining inlet and outlet ports communicating with said bores; a ball including a flow passage rotatably mounted in said central bore; valve seats slidably and rotatably mounted in said reduced bores and having enlarged portions terminating in shoulders; a ball engaging valve seal slidably mounted in each of said portions; said valve seats and said portions containing said seals being movable from an operative ball engaging position to a ball clearance position against said bore and port defining shoulders; a cam slot formed in the outer periphery of said seats; pins fixed to said casing and projecting into said slots to effect axial movement of said seats between said positions upon rotation of said seats; spring means acting between said enlarged portion shoulders and said seals to urge said seals against said ball in operative position; said valve casing including a removable cover for the insertion of said ball, a recess formed in the outer peripheries of said valve seats, and retaining pins projecting from said cover and into said recesses to limit the movement of said valve seats toward said ball to limit the pressure of said seals against said ball and retain said valve seats in operative position.

References Cited by the Examiner

UNITED STATES PATENTS

| | | | |
|---|---|---|---|
| 2,480,529 | 8/1949 | Waag | 251—174 X |
| 3,037,738 | 6/1962 | Jackson | 251—188 X |
| 3,038,693 | 6/1962 | Dumm | 251—171 |
| 3,209,778 | 10/1965 | Flohr | 137—327 |

FOREIGN PATENTS

| | | |
|---|---|---|
| 559,270 | 6/1958 | Canada. |
| 1,317,532 | 1/1963 | France. |
| 1,102,510 | 3/1961 | Germany. |

WILLIAM F. O'DEA, *Primary Examiner.*

ISADOR WEIL, *Examiner.*

H. WEAKLEY, *Assistant Examiner.*